W. A. Simonds.
Carburetor.
Nº 106,378. Patented Feb. 12, 1870.
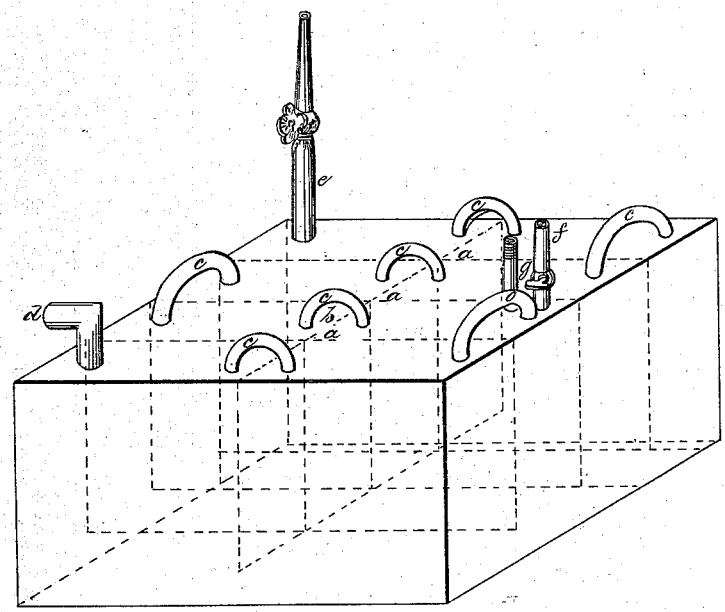
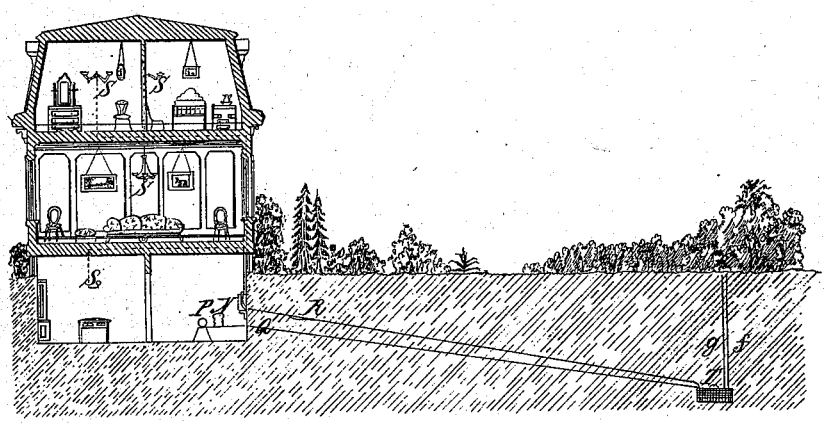
Witnesses:
Inventor:
Warren A. Simonds

UNITED STATES PATENT OFFICE.

WARREN A. SIMONDS, OF BOSTON, ASSIGNOR TO JOEL M. HOLDEN, OF NEWTON, MASSACHUSETTS.

IMPROVEMENT IN CARBURETING APPARATUS.

Specification forming part of Letters Patent No. 105,378, dated July 12, 1870.

I, WARREN A. SIMONDS, of Boston, in the county of Suffolk and State of Massachusetts, have invented a new and useful Carbureting Apparatus, which I call the "Underground Vapor Gas-Machine;" and declare the nature, construction, and operation thereof to be as herein set forth.

The nature of the invention consists, first, in a tank, subdivided by partitions extending nearly to the bottom of the tank, into cells, which connect by U-tubes with each other, so as to secure great superficial exposure of hydrocarbon to the traverse of the carbonizing-air, and in sinking said tank in the ground below the frost penetration, to insure a uniform temperature throughout the year; second, in interposing between the air-pump and said tank a long pipe sunk in the ground, to dry and temper the air before it reaches the tank; third, in a drying-chamber filled with hygroscopic material, and interposed between the air-pump and the carbureting-tank.

Construction.

In the drawing, Figure 1 is an isometrical view of the carbureting-tank and attachments. Fig. 2 is a section of a house whose artificial light is procured by this apparatus. This shows the relative arrangement of the tank. Of course, by some sacrifice of power the inlet-pipe Q may be coiled, and the tank brought nearer the house; but the simpler form is preferable, if the size of the house-lot permits.

I prepare a metal tank, Fig. 1, of size sufficient to hold a supply of gasoline for a considerable period—say, some months of constant use.

Partitions $a$ and $b$ extend within an inch or two of the bottom of the tank and divide it into cells. These cells communicate with each other by U-tubes $c$, making an uptake from one cell, and a down-blast impinging on the surface of the gasoline in the next when the machine is working. Air enters the tank by inlet $d$, and after traversing the surface of the gasoline in each cell is delivered by outlet $e$ toward the burners. The tank is sunk in the ground—say, ten feet deep, at any rate below the action of frost—and is covered with earth. Tube $f$ rises from near the bottom of the tank to the surface of the ground, and is used as a filler to supply the tank with gasoline, or to pump out waste, and tube $g$ is a vent during these operations. At all other times they are to be closed.

Tank T is to be sunk in the ground at, say, forty feet from the house; and the inlet and outlet-pipes are also to be buried, not quite so deeply at the house as at the tank—say, with a slope of from four to ten feet, or one in six or seven. If a coil is used a helix is preferable to a volute, because of the regularity of its slope.

The temperature of the ground at ten feet deep is pretty uniform in the American climate all the year round, and by experiment in the vicinity of Boston is found not to vary much from 55° Fahrenheit.

The air-pump of the apparatus is situated in the house to be lighted, as at P. It forces air through tube Q to tank T, where it arrives at the temperature of the earth. Being slightly raised in cold weather, it is drier than it would be ordinarily at that temperature, and will thus take up more hydrocarbon. In summer the moisture will be partly condensed out of it by lowering the temperature, and this flowing into the tank will sink below the gasoline, and may be suffered to remain until it is time to clean out the tank. A drying-chamber filled with hygroscopic substance, such as quicklime, may be arranged in this tube, as at N, so as to still further dry the air. The air, charged with hydrocarbon, is returned from tank T by pipe R, and distributed to burners S.

At a given temperature, it is obvious that dry air will carry more hydrocarbon than saturated air; and, as in summer, and indeed, usually in winter, the temperature of the house-piping will generally be higher than that of the tank, the fear of condensation in the house-tubes must be very slight.

I claim as my invention and desire to secure by Letters Patent—

1. Tank T, subdivided by partitions $a$ and $b$ into cells, such cells being connected by U-tubes $c$, and provided with a filling and cleaning tube, $f$, when such tank is buried in the earth at a distance from the building to be lighted and below the reach of frost, substantially as and for the purpose described.

2. The arrangement of inlet-tube Q, a long pipe interposed between pump P and tank T, buried in the ground below the reach of frost, substantially as and for the purpose described.

3. The arrangement of drying-chamber N, filled with hygroscopic substance, between pump P and tank T, substantially as and for the purpose described.

WARREN A. SIMONDS.

Witnesses:
THOS. WM. CLARKE,
JAMES HOOPER.